United States Patent
Lenz et al.

(10) Patent No.: US 12,147,294 B1
(45) Date of Patent: Nov. 19, 2024

(54) VIRTUALIZED OVERCURRENT ALERTING

(71) Applicant: Hewlett-Packard Development Company, L.P., Spring, TX (US)

(72) Inventors: Kathleen E Lenz, Fort Collins, CO (US); Jeanette M Calvert Coffren, Fort Collins, CO (US); Michael A Miller, Fort Collins, CO (US); Jean-Claude Sessou, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 74 days.

(21) Appl. No.: 18/316,653

(22) Filed: May 12, 2023

(51) Int. Cl.
*G06F 11/07* (2006.01)
*G06F 11/30* (2006.01)
*G06F 13/42* (2006.01)

(52) U.S. Cl.
CPC ...... *G06F 11/0772* (2013.01); *G06F 11/3027* (2013.01); *G06F 13/4282* (2013.01)

(58) Field of Classification Search
CPC ............. G06F 11/0772; G06F 11/3027; G06F 13/4282
See application file for complete search history.

(56) References Cited

U.S. PATENT DOCUMENTS

| | | | | |
|---|---|---|---|---|
| 6,064,554 A * | 5/2000 | Kim | ........................ | G06F 1/266 361/64 |
| 6,067,628 A * | 5/2000 | Krithivas | ........... | G01R 31/3004 710/63 |
| 11,494,281 B1 * | 11/2022 | Fox | ..................... | G06F 11/0772 |
| 2008/0005415 A1 * | 1/2008 | Lopez | ................... | G06F 13/385 710/62 |
| 2008/0244108 A1 * | 10/2008 | Abramson | .............. | G06F 21/85 710/16 |
| 2014/0129856 A1 * | 5/2014 | Bertin | ..................... | G06F 1/266 713/320 |
| 2015/0355696 A1 * | 12/2015 | Pamley | ................. | G06F 1/3203 713/300 |
| 2015/0356034 A1 * | 12/2015 | Pamley | ............... | G06F 13/4027 710/308 |
| 2018/0026471 A1 * | 1/2018 | Lu | .......................... | H02J 7/007 320/134 |
| 2019/0319409 A1 * | 10/2019 | Vispute | .......... | H03K 19/018557 |
| 2019/0319410 A1 * | 10/2019 | Mondal | ............... | G06F 13/4282 |

(Continued)

*Primary Examiner* — Joseph O Schell
*Assistant Examiner* — Indranil Chowdhury
(74) *Attorney, Agent, or Firm* — Knobbe, Martens, Olson & Bear, LLP (57) ABSTRACT

The disclosed technology is directed to a computing device for triggering an alert to a user about an occurrence of overcurrent at a first USB port of the computing device. In some examples, the computing device includes a USB interface circuit, a system processor and a host controller. Responsive to detecting the occurrence of overcurrent at the first USB port, the USB interface circuit transmits an alert signal to the system processor through a control bus without communicating directly with the host controller. The system processor determines the alert signal indicates the occurrence of overcurrent at the first USB port and sets an overcurrent register at the host controller to a first value to indicate the occurrence of overcurrent at the first USB port. The host controller triggers the alert to the user responsive to the overcurrent register being set to the first value.

20 Claims, 3 Drawing Sheets

(56) References Cited

U.S. PATENT DOCUMENTS

| | | | |
|---|---|---|---|
| 2019/0319446 A1* | 10/2019 | Mondal | H02H 3/087 |
| 2021/0406113 A1* | 12/2021 | Chaiken | G06F 11/0793 |
| 2022/0077672 A1* | 3/2022 | Mevada | H02H 3/00 |
| 2022/0197364 A1* | 6/2022 | Gopalakrishnan | G06F 13/4282 |

* cited by examiner

VIRTUALIZED OVERCURRENT ALERTING

BACKGROUND

Universal Serial Bus (USB) interfaces have become prevalent in computing systems to implement various functions, such as data transmission and charging. Typical implementations of the USB interfaces include USB ports or connectors that are accessible by users for connecting external USB devices to computing systems. In some cases, faulty or malicious USB devices may be connected to a USB port.

SUMMARY

The systems, methods and devices of this disclosure each have several innovative embodiments, no single one of which is solely responsible for all of the desirable attributes disclosed herein. Details of one or more implementations of the subject matter described in this specification are set forth in the accompanying drawings and the description below.

In some embodiments, the techniques described herein relate to a computing device including: a universal serial bus (USB) interface card, including: a first universal serial bus (USB) port, wherein the first USB port is to connect to a USB device external to the computing device; a power delivery controller to: detect an occurrence of overcurrent at the first USB port connected to the USB device; and responsive to detecting the occurrence of the overcurrent at the first USB port, transmit an alert signal to a system input/output circuit through a control bus without communicating directly with a host controller; the system input/output circuit to, responsive to receiving the alert signal, generate a system management interrupt; a system processor to: detect the system management interrupt; responsive to detecting the system management interrupt, determine the occurrence of the overcurrent at the first USB port; and set an overcurrent register at the host controller to a first value to indicate the occurrence of the overcurrent at the first USB port; the host controller to, responsive to the overcurrent register being set to the first value, trigger an alert for display to a user.

In some embodiments, the techniques described herein relate to a computing device, wherein to trigger the alert for display to the user, the host controller sends an interrupt message to an operating system (OS) of the computing device through an Advanced Configuration and Power Interface (ACPI).

In some embodiments, the techniques described herein relate to a computing device, wherein the system processor is to: access mapping information stored at a first register of the host controller; and determine based on the mapping information that the first USB port corresponds to the overcurrent register.

In some embodiments, the techniques described herein relate to a computing device, further including a memory to store firmware code executable by the system processor, wherein the firmware code includes the mapping information, and wherein the system processor executes the firmware code to store the mapping information at the first register of the host controller.

In some embodiments, the techniques described herein relate to a computing device, wherein the host controller and the first USB port lack a physical signal path that connects the host controller to the first USB port.

In some embodiments, the techniques described herein relate to a computing device, wherein the control bus is one of a System Management Bus (SMBus), an Inter-Integrated Circuit (I2C), an Improved Inter-Integrated Circuit (I3C), or a Universal Asynchronous Receiver/Transmitter (UART).

In some embodiments, the techniques described herein relate to a computing device, further including a display, wherein the alert of the overcurrent at the first USB port is displayed via the display.

In some embodiments, the techniques described herein relate to a computing device including: a first universal serial bus (USB) port, wherein the first USB port is to connect to a USB device external to the computing device; a power delivery controller to: detect an occurrence of power overdraw at the first USB port connected to the USB device; and responsive to detecting the occurrence of the power overdraw at the first USB port, transmit an alert signal to a system processor through a control bus without communicating directly with a host controller; the system processor to: determine that the alert signal indicates the occurrence of the power overdraw at the first USB port; and set an overcurrent register at the host controller to a first value to indicate the occurrence of the power overdraw at the first USB port; the host controller to, responsive to the overcurrent register being set to the first value, trigger an alert for display to a user.

In some embodiments, the techniques described herein relate to a computing device, further including a mainboard, wherein the first USB port, the power delivery controller, the system processor and the host controller are deployed on the mainboard.

In some embodiments, the techniques described herein relate to a computing device, wherein the power overdraw at the first USB port is an overcurrent or an overvoltage at the first USB port.

In some embodiments, the techniques described herein relate to a computing device, further including a USB interface card, wherein the first USB port and the power delivery controller are deployed on the USB interface card.

In some embodiments, the techniques described herein relate to a computing device, wherein the system processor is to: access mapping information stored at a first register of the host controller; and determine the mapping information corresponds the first USB port to the overcurrent register.

In some embodiments, the techniques described herein relate to a computing device, wherein the host controller and the first USB port lack a physical signal path that connects the host controller to the first USB port.

In some embodiments, the techniques described herein relate to a computing device, wherein the control bus is a System Management Bus (SMBus), an Inter-Integrated Circuit (I2C), an Improved Inter-Integrated Circuit (I3C), or a Universal Asynchronous Receiver/Transmitter (UART).

In some embodiments, the techniques described herein relate to a computing device, wherein to trigger the alert for display to the user, the host controller is to send an interrupt message to an operating system (OS) of the computing device through an Advanced Configuration and Power Interface (ACPI).

In some embodiments, the techniques described herein relate to a computing device, wherein responsive to receiving the interrupt message, the OS causes the alert displayed to the user.

In some embodiments, the techniques described herein relate to a method for triggering an alert of an occurrence of overcurrent at a first port of a computing system, wherein the first port is to connect to a device external to the computing system, the method including: detecting the occurrence of the overcurrent at the first port connected to the device;

responsive to detecting the occurrence of the overcurrent at the first port, transmitting an alert signal to a system processor of the computing system through a control bus without communicating directly with a host controller of the computing system; determining that the alert signal indicates the occurrence of the overcurrent at the first port; setting an overcurrent register at the host controller to a first value to indicate the occurrence of the overcurrent at the first port; and triggering the alert of the occurrence of the overcurrent at the first port.

In some embodiments, the techniques described herein relate to a method, wherein triggering the alert of the occurrence at the first port includes: sending an interrupt message to an operating system (OS) of the computing system through an Advanced Configuration and Power Interface (ACPI).

In some embodiments, the techniques described herein relate to a method, further including: accessing mapping information stored at a first register of the host controller; and determining the mapping information corresponds the first port to the overcurrent register.

In some embodiments, the techniques described herein relate to a method, wherein the host controller and the first port lack a physical signal path that connects the host controller to the first port.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

DETAILED DESCRIPTION

The Universal Serial Bus (USB) interface provides a serial bus standard for connecting devices such as computers, personal digital assistants, storage elements, televisions, and so forth. As USB devices are connected to a computing system, there may be situations when a USB device connected to a USB port of the computing system unintentionally or maliciously draws excessive power or current. Typically, the USB specifications permit a USB port to draw a maximum current between 100 milliamperes to 500 milliamperes. An overcurrent condition may occur at a USB port when the USB port draws more than the maximum current permitted by a USB specification. Some USB specification may dictate that when an overcurrent condition occurs at a USB port, the USB port is to be effectively disabled or isolated from a computing system.

Some computing systems implement mechanisms to detect and report occurrence of power overdraw, overcurrent or overvoltage at a USB port to comply with the USB specifications or improve system performance. For example, an overcurrent detection circuit may be deployed around a USB port to generate a control signal in response to detecting an occurrence of overcurrent condition at the USB port. The control signal may then be processed by a host controller to trigger an alert for responding to the overcurrent condition at the USB port.

To facilitate communications between the overcurrent detection circuit and the host controller, additional hardware resources may be utilized. For example, a physical signal path may route communications between a USB port and the host controller for connecting a power rail associated with the USB port to an input pin of the host controller. The power rail associated with the USB port may be connected to a power supply through a power switch. When an overcurrent condition occurs at the USB port, the power switch may open because of the overcurrent condition, driving a voltage potential of the power rail associated with the USB port from a high voltage to a low voltage, which in turn also drives the input pin of the host controller from a high voltage to a low voltage. When the host controller detects that the input pin is driven to the low voltage, the host controller may generate an alert signal to indicate an occurrence of an overcurrent condition at the USB port such that a computing device may take responsive actions to respond to the overcurrent condition.

However, there may be situations where hardware resources (e.g., input pins of a host controller) are limited or constrained when designing overcurrent detection or reporting circuitry. For example, when a computing system supports operations associated with multiple USB devices, the host controller may not have enough input pins dedicated for each of the USB ports for detecting and reporting overcurrent conditions at individual USB ports. Additionally, even if there are enough input pins dedicated for each of the USB ports, a mainboard, daughterboard, or a printed circuit board (PCB) of the computing device may not have enough area to accommodate the routing between the overcurrent detection circuit and the host controller. At the least, the additional hardware resources may result in an increase of the complexity or cost for designing a computing system.

As such, it may be desirable to implement an overcurrent detection and reporting mechanism to respond to an overcurrent condition under constrained or limited hardware resources. Some embodiments of the present disclosure detect and report a power overdraw (e.g., overcurrent or overvoltage) condition at a USB port through a virtual signal path between the USB port and a host controller. In some examples, without communicating directly with a host controller through a dedicated physical signal path, a USB interface circuit may transmit an alert signal to a system input/output (I/O) circuit upon detecting a power overdraw condition. Responsive to receiving the alert signal, the system I/O circuit may generate a system management interrupt (SMI), which causes a system processor to set an overcurrent register at the host controller to a particular value to indicate the occurrence of the power overdraw at the USB port. The host controller may trigger an alert for display to a user responsive to the overcurrent register being set to the particular value.

In some examples, some of the disclosed embodiments may be implemented in hardware, firmware, software, or any combination thereof. Some of the disclosed embodiments may be implemented as instructions stored in a transitory or non-transitory computer-readable storage medium, which may be read and executed by a processor core or thread. Further, the instructions may be updated and/or obtained from a remote server via a network connection.

Example Computing Device

Figure 1:
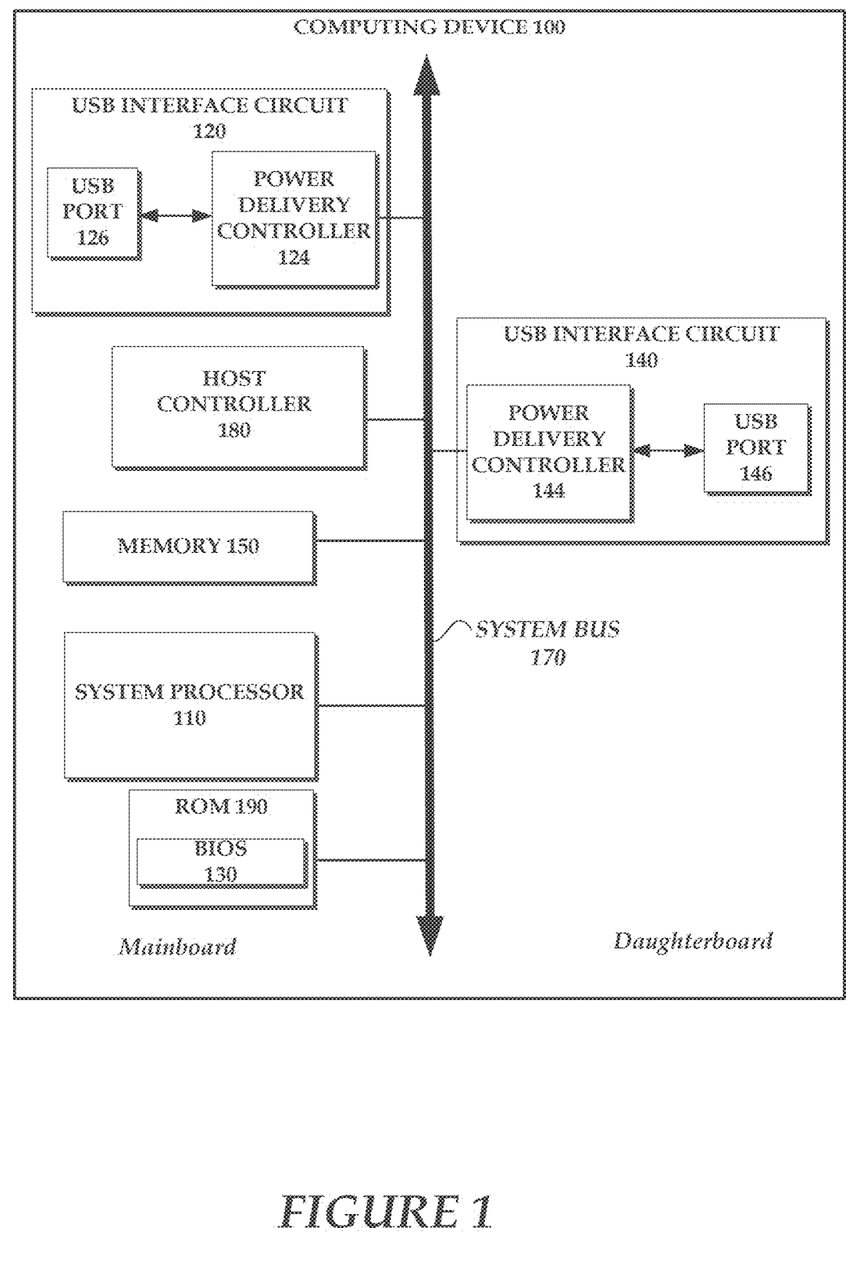
FIG. 1 illustrates a block diagram of an example computing device in which some examples of the present disclosure may be implemented.

FIG. 1 illustrates a block diagram of an example computing device 100 in which examples of the present disclosure may be implemented. Examples of the computing device 100 may include, but not limited to, laptops, desktops, tablets, wearable computers, smartphones, personal digital assistants (PDA), hybrid PDA/mobile phones, set-top boxes, voice command devices, smartphones, and digital media players. In some examples, the computing device 100 includes a system processor 110, a read-only memory (ROM) 190 that stores a basic input/output system (BIOS) 130, a memory 150, a host controller 180, a USB interface circuit 120 and a USB interface circuit 140. As illustrated in FIG. 1, the system processor 110, the ROM 190, the memory 150, the host controller 180, the USB interface circuit 120 and the USB interface circuit 140 may communicate with each other through the system bus 170. Further, FIG. 1 illustrates an example situation where the system processor 110, the ROM 190, the memory 150, the host controller 180 and the USB interface circuit 120 are deployed on a mainboard of the computing device 100, whereas the USB interface circuit 140 is deployed on a daughterboard or a USB card (not shown in FIG. 1) of the computing device 100. It should be understood that other configurations of the computing device 100 are possible. For example, the USB interface circuit 140 may be included on the mainboard (or motherboard).

In some examples, the system processor 110 may be embodied as any type of single-core, single-thread, multi-core, or multi-thread processor capable of performing functions as described herein. The system processor 110 may be embodied as a processing unit (CPU), digital signal processor (DSP), microprocessor, central microcontroller, or other processor or processing/controlling circuit. As illustrated in FIG. 1, the system processor 110 may communicate with the USB interface circuit 120, the USB interface circuit 140, the ROM 190, the memory 150, and/or the host controller 180 through the system bus 170. In some examples, although not illustrated in FIG. 1, the system processor 110 may directly communicate with the memory 150 to access data and instructions stored in the memory 150 to perform various functions.

In some examples, the host controller 180 may be embodied as circuitry or components to facilitate input/output operations with the system processor 110, the memory 150, the USB interface circuit 120, the USB interface circuit 140 or other components of the computing device 100. For example, the host controller 180 may be embodied as, or otherwise include, platform controller hubs, input/output control hubs, firmware devices, communication links such as bus links and printed circuit board traces, and other components that can facilitate input/output operations associated with components such as the peripherals of the computing device 100. In some examples, the host controller 180 may be a part of a system-on-a-chip and can be deployed along with the system processor 110 and other components of the computing device 100 on a single or multiple integrated circuits or chipsets. In some examples, the host controller 180 may be embodied as a Platform Controller Hub (PCH) or may implement the extensible Host Controller Interface (xHCI) specification to facilitate communications between USB interface circuit 120, USB interface circuit 140 and other components (e.g., the system processor 110) of the computing device 100.

In some examples, the memory 150 may be embodied as any type of volatile or non-volatile memory or data storage, such as dynamic random access memory (DRAM), static random access memory (SRAM), synchronous DRAM (SDRAM), double data rate synchronous dynamic random access memory (DDR SDRAM). The memory 150 may store various data and program code used during operation of the computing device 100, including operating systems, application programs, libraries, driver, and the like. As mentioned above, the memory 150 may be communicatively coupled to the system processor 110 through the system bus 170, or may be directly coupled to the system processor 110.

As used herein, a basic input/output system (BIOS) 130 refers to hardware or hardware and instructions to initialize, control, or operate a computing device prior to execution of an operating system (OS) of the computing device. Instructions included within a BIOS 130 may be software, firmware, microcode, or other programming that defines or controls functionality or operation of a BIOS 130. In one example, a BIOS 130 may be implemented using instructions, such as platform firmware of a computing device, executable by a processor. A BIOS 130 may operate or execute prior to the execution of the OS of a computing device. A BIOS 130 may initialize, control, or operate components such as hardware components of a computing device and may load or boot the OS of a computing device 100. In some examples, a BIOS 130 may provide or establish an interface between hardware devices or platform firmware of the computing device and an OS of the computing device 100, via which the OS of the computing device may control or operate hardware devices or platform firmware of the computing device 100. In some examples, a BIOS 130 may implement the Unified Extensible Firmware Interface (UEFI) specification or another specification or standard for initializing, controlling, or operating a computing device 100. The BIOS 130 may be stored by a memory, such as a read-only memory (ROM) 190, flash memory (not shown in FIG. 1), or other non-volatile memory.

In some examples, the USB interface circuit 140 may include the power delivery controller 144 and the USB port 146. The USB port 146 may be compatible with the USB 2.0, USB 3.0, USB 3.1 or other USB specifications. In some examples, the USB port 146 may be a USB Type-C connector port that allows an external device (not shown in FIG. 1) compatible with the USB Type-C standard to connect to the computing device 100. When the external device is connected to the computing device 100 via the USB port 146, the USB interface circuit 140 may detect the connection and initiate USB communication protocols to enable communication between components (e.g., the system processor 110, the host controller 180 or the memory 150) of the computing device 100 and the connected external device.

During the communication between components of the computing device 100 and the external device, the power delivery controller 144 may manage or control power drawn by the external device to comply with the USB specification. In some examples, the power delivery controller 144 may monitor power, voltage or current drawn from the USB port 146 to detect an occurrence of power overdraw, overvoltage or overcurrent at the USB port 146 to facilitate reporting the occurrence of overcurrent at the USB port 146 to other components (e.g., the system processor 110 or the host controller 180) of the computing device 100 such that the computing device 100 may respond to the power overdraw, overvoltage or overcurrent condition appropriately. In some examples, the power overdraw, overvoltage, or overcurrent condition may result from a short circuit or a voltage short situation associated with the USB port 146.

For example, when a current drawn from the USB port 146 exceeds a limit (e.g., 100 milliamperes or 500 milliamperes), the power delivery controller 144 may detect an occurrence of overcurrent at the USB port 146. Specifically, when the current drawn from the USB port 146 exceeds the limit, a power switch or an eFuse (electronic fuse) connecting the USB port 146 and a supply voltage (e.g., 5 V power supply) may open or break, which in turn may drive a voltage potential at the USB port 146 to a low voltage (e.g., near to 0 V) to indicate or notify the occurrence of overcurrent at the USB port 146. Upon notification of the occurrence of overcurrent at the USB port 146, the host controller 180 of the computing device 100 may trigger responsive actions, such as placing the USB port 146 in a powered-off state, ignoring data communication through the USB port 146, or other actions that may isolate the external device (not shown in FIG. 1) connected to the USB port 146.

In some examples, the host controller 180 may be notified of the occurrence of overcurrent at the USB port 146 through a physical signal path such as a metal trace (not shown in FIG. 1) that connects the USB port 146 to an input pin (not shown in FIG. 1) of the host controller 180. More specifically, when the voltage potential at the USB port 146 is driven to the low voltage, the input pin of the host controller 180 may be driven to the low voltage as well because the physical signal path connects the USB port 146 to the input pin of the host controller 180. Upon monitoring that the input pin is driven to the low voltage, the host controller 180 may trigger the responsive actions mentioned above to respond to the overcurrent condition at the USB port 146. It should be noted that, in some examples, the USB interface circuit 140 may include more than one USB ports.

In some examples, the USB interface circuit 120 may include the power delivery controller 124 and the USB port 126. As illustrated in FIG. 1, unlike the USB interface circuit 140 that may be deployed on a daughterboard or an extension card of the computing device 100, the USB interface circuit 120 may be deployed on a mainboard of the computing device 100. In operation, the USB interface circuit 120, the USB port 126 and the power delivery controller 124 may function the same or similar to the USB interface circuit 140, the USB port 146 and the power delivery controller 144, respectively. For example, the USB interface circuit 120 may coordinate with the host controller 180 to facilitate detecting, reporting or responding to an occurrence of overcurrent at the USB port 126 the same or similar to the coordination between the host controller 180 and the USB interface circuit 140. It should be noted that, in some examples, the computing device 100 may include more or fewer USB interface circuits that may be allocated among the mainboard and the daughterboard in different configurations from the illustration of FIG. 1.

In some examples, the USB interface circuit 140 and/or the USB interface circuit 120 may include circuitry and ports supporting other communication protocols/interfaces besides the USB standard. For example, in addition to the USB port 146, the USB interface circuit 140 may include other types of connectors such as Peripheral Component Interconnect Express (PCIe) slots, Serial Advanced Technology Attachment (SATA) ports, or any types of ports that may supply power to devices connected to the ports. In some examples, the USB interface circuit 140 and/or the USB interface circuit 120 may include connectors/ports including thunderbolt ports, lightning connectors, High-Definition Multimedia Interface (HDMI) ports, or DisplayPort connectors, or the like.

Example Overcurrent Reporting Blocks

Figure 2:
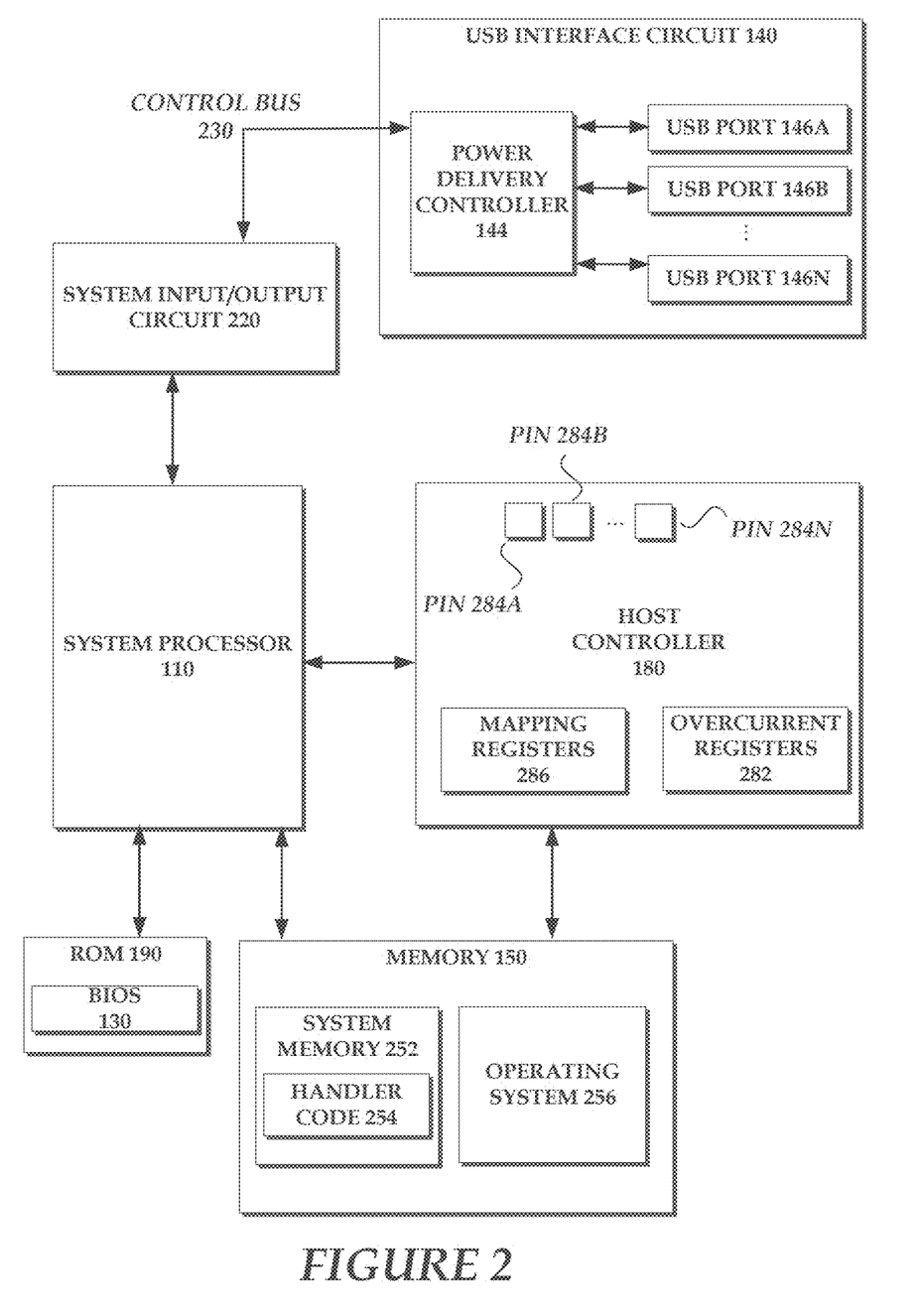
FIG. 2 illustrates a block diagram with additional details of the computing device of FIG. 1 and in which a direct communication channel between the host controller and the USB interface circuit is omitted in accordance with some examples of the present disclosure.

FIG. 2 illustrates an example block diagram of a host controller 180, USB interface circuit 140 and other components (e.g., the memory 150, the system processor 110, the system input/output circuit 220, and the BIOS 130) that can detect and report an occurrence of overcurrent at a particular USB port (e.g., one of the USB ports 146A through 146N) without a direct communication channel between the host controller 180 and the USB interface circuit 140 in accordance with some examples of the present disclosure. Notably, FIG. 2 illustrates that there may be limited hardware resources for designing overcurrent detection or reporting circuitry in that there is no physical signal path directly routed between the USB ports 146A through 146N and the host controller 180. For example, a first pin (e.g., one of the pins 284A through 284N) and a first USB port (e.g., one of the USB ports 146A through 146N) lack a physical signal path that connects the first pin to the first USB port.

As illustrated in FIG. 2, the USB interface circuit 140 includes the power delivery controller 144 and the USB ports 146A through 146N. N may be any positive integer such that any number of USB ports can be accommodated by the USB interface circuit 140.

As shown in FIG. 2, each of the USB ports 146A through 146N may be connected to the power delivery controller 144. As such, the power delivery controller 144 may be able to detect an occurrence of overcurrent at each of the USB ports 146A through 146N.

In some examples, the power delivery controller 144 may be communicatively coupled to the system input/output circuit 220 through a control bus 230. The control bus 230 may be embodied as a System Management Bus (SMBus), an Inter-Integrated Circuit (I2C), an Improved Inter-Integrated Circuit (I3C), a Universal Asynchronous Receiver/Transmitter (UART) or other communication links that can facilitate exchange of control signal between the power delivery controller 144 and the system input/output circuit 220. In some examples, the power delivery controller 144 may transmit an alert signal to the system input/output circuit 220 through the control bus 230 upon detecting an occurrence of overcurrent at one of the USB ports 146A through 146N.

In some examples, the system input/output circuit 220 may be any interface circuitry that can receive or process power control or management signals from the power delivery controller 144. In some examples, the system input/output circuit 220 may be implemented as a part of a system-on-a-chip along with the system processor 110 or other components (e.g., the memory 150 or the host controller 180). In some examples, the system input/output circuit 220 may generate a system management interrupt (SMI) and transmit the SMI to the system processor 110 in response to receiving the alert signal from the power delivery controller 144, where the alert signal may indicate an occurrence of power overdraw, overvoltage or overcurrent at one of the USB ports 146A through 146N.

In some examples, the memory 150 may include the system memory 252 and the operating system 256. The system memory 252 may be used to store sensitive or secure code (e.g., the handler code 254) not accessible by the system processor 110 unless the system processor 110 receives an interrupt signal (e.g., the SMI generated by the system input/output circuit 220) and enters into a special operation mode (e.g., a system management mode (SMM)). In some examples, the system memory 252 may be a system management RAM (SMRAM) and the handler code 254 in the system memory 252 may be set up by the BIOS 130 during bootup process of the computing device 100. The handler code 254 may include information (e.g., data and instructions) that, when executed by the system processor 110, allows the system processor 110 to handle the SMI generated by the system input/output circuit 220 or other components (e.g., the system processor 110 or the host controller 180) of the computing device 100.

Additionally, the operating system 256 may be loaded onto the memory 150 and executed by the system processor 110 to facilitate various operations associated with the computing device 100. When running on the memory 150, the operating system 256 may facilitate displaying information (e.g., a notification of an overcurrent condition at one of the USB ports 146A through 146N) through a display (not shown in FIG. 2) of the computing device 100.

As illustrated in FIG. 2, the host controller 180 may include the mapping registers 286, the overcurrent registers 282, and the pins 284A through 284N. In some examples, each of the pins 284A through 284N may be a general purpose input/output (GPIO) pin of the host controller 180. In other examples, each of the pins 284A through 284N may be an input pin or an output pin of the host controller 180.

The mapping registers 286 may store mapping information that maps one or more of the USB ports 146A through 146N to one or more of the pins 284A through 284N. In some examples, the mapping information may be represented by different logical values at one or more addressable locations of the mapping registers 286. In some examples, the mapping information may be set up by the BIOS 130 during bootup of the computing device 100, and may be updated as a part of a firmware update to the computing device 100.

In some examples, the overcurrent registers 282, when set, may facilitate the reporting of an overcurrent condition at one or more specific USB ports. For example, one of the overcurrent registers 282 may be set to indicate an occurrence of overcurrent at the USB port 146A; and another of the overcurrent registers 282 may be set to indicate an occurrence of overcurrent at the USB port 146B. Depending on limitations of hardware resources for designing overcurrent detection and reporting circuitry, some or all of the mapping registers 286, the overcurrent registers 282, and the pins 284A through 284N may be utilized by the computing device 100 for overcurrent detection and reporting.

(1) Less Limited or Unlimited Hardware Resources

Under situations where hardware resources are less limited (in contrast to the illustration of FIG. 2), there may be physical signal paths connecting each of the USB ports 146A through 146N to one of the pins 284A through 284N for overcurrent detection and reporting.

In some examples, a physical signal path may connect the USB port 146A with the pin 284A, a physical signal path may connect the USB port 146B with the pin 284B, and a physical signal path may connect the USB port 146N with the pin 284N. In other words, the USB port 146A may map or correspond to the pin 284A, the USB port 146B may map to the pin 284B, and the USB port 146N may map to the pin 284N through respective physical signal paths connecting one USB port to one pin. As such, overcurrent detection and reporting at a particular USB port may be facilitated by the respective physical signal path.

For example, when an overcurrent condition occurs at the USB port 146A, a voltage potential at the USB port 146A may be driven to a low voltage because of the opening of a power switch associated with the USB port 146A, which in turn drives the pin 284A to the low voltage because of the physical signal path connecting the USB port 146A and the pin 284A.

Responsive to monitoring the pin 284A be driven to the low voltage, the system processor 110 may set an overcurrent register 282 that is associated with pin 284A to a particular value to indicate the occurrence of overcurrent at the USB port 146A.

Responsive to the overcurrent register 282 that is associated with pin 284A being set to the particular value, the host controller 180 may route an interrupt message to the operating system 256 of the computing device 100 through an interface such as an Advanced Configuration and Power Interface (ACPI).

Upon receiving the interrupt message from the host controller 180, the operating system 256 may cause an alert indicating an occurrence of overcurrent at the USB port 146A be notified (e.g., through a display of the computing device 100 not shown in FIG. 2) to a user.

(2) Limited Hardware Resources

Under limited hardware resources (as illustrated in FIG. 2), there may be no physical signal path between the USB interface circuit 140 and the host controller 180 for detecting and reporting an overcurrent condition associated with one or more of the USB ports 146A through 146N. Specifically, there may be no physical signal path between the USB port 146A and the pin 284A, the USB port 146B and the pin 284B, or the USB port 146N and the pin 284N. Thus, for example, when an overcurrent condition occurs at the USB port 146A, the pin 284A may not be driven to a low voltage responsive to a voltage potential at the USB port 146A be driven to a low voltage. Without other techniques or mechanisms, the system processor 110 may not monitor the pin 284A being driven to the low voltage for setting the overcurrent register 282 that is associated with pin 284A to the particular value to indicate the occurrence of overcurrent at the USB port 146A.

Described below are techniques that detect and report an overcurrent condition at one of the USB ports 146A through 146N without direct communication or dedicated physical signal path between the USB port and the host controller 180 in accordance with some embodiments of the present disclosure.

For illustrative purpose, it is assumed that an overcurrent condition occurs at the USB port 146N. It should be noted that techniques described below are also applicable to overcurrent conditions at USB ports 146B through 146N or overcurrent conditions at USB ports 126. Besides being applicable to USB ports, the techniques described below may be applied to other communication ports or connectors that support power overdraw, overcurrent or overvoltage detection and reporting.

When an overcurrent condition occurs at the USB port 146N, the power delivery controller 144 may detect the occurrence of overcurrent at the USB port 146N by, for example, monitoring the voltage variation or the current flow at the USB port 146N. Responsive to detecting the occurrence of the overcurrent at the USB port 146N, the power delivery controller 144 may transmit an alert signal to the system input/output circuit 220 through the control bus 230. In some examples, the alert signal may indicate that occurrence of an overcurrent condition at the USB port 146N.

In other examples, the alert signal may simply indicate the occurrence of an overcurrent condition at the USB interface circuit 140 without identifying the overcurrent condition occurs at the USB port 146N. In these examples, the power delivery controller 144 may generate and store a message that identifies the USB port 146N as the source of the overcurrent condition. The message may be stored at a register (not shown in FIG. 2) inside the USB interface circuit 140 or the system input/output circuit 220. The system processor 110 may later access the message to determine that the overcurrent condition occurs at the USB port 146N.

Upon receiving the alert signal from the power delivery controller 144, the system input/output circuit 220 may generate a system management interrupt (SMI). Additionally, the system input/output circuit 220 may transmit the SMI to the system processor 110 through a communication link (e.g., the system bus 170) between the system input/output circuit 220 and the system processor 110.

The system processor 110 may then detect the SMI from the system input/output circuit 220. In some examples, the SMI may be fed into a physical pin of the system processor 110. By monitoring the physical pin, the system processor 110 may detect the SMI. In other examples, instead of receiving the SMI from a physical pin, virtual wires may be utilized. For example, a message may be sent from the system input/output circuit 220 through a virtual wire on a direct media interface (DMI) bus to the system processor 110 such that the system processor 110 may detect system management interrupt.

Responsive to detecting the SMI, the system processor 110 may determine the occurrence of the overcurrent at the USB port 146N. In some examples, the system processor 110 may enter a system management mode (SMM) and execute the handler code 254 to determine the overcurrent condition indicated by the alert signal is occurring at the USB port 146N. More specifically, by executing the handler code 254, the system processor 110 may access and decode a message generated by the power delivery controller 144 when the power delivery controller 144 detects the occurrence of overcurrent at the USB port 146N. The message may identify the USB port 146N as the port that draws overcurrent.

In other examples, the alert signal received by the system input/output circuit 220 may identify USB port 146N as the port that draws overcurrent and the system input/output circuit 220 may transmit this information to the system processor 110 along with the transmission of the SMI such that the system processor 110 may determine the occurrence of the overcurrent at the USB port 146N.

After the system processor 110 determines the occurrence of the overcurrent at the USB port 146N, the system processor 110 may set an overcurrent register 282 at the host controller 180 to a first value to indicate the occurrence of the overcurrent at the USB port 146N.

In some examples, the system processor 110 may access the mapping registers 286 to identify the overcurrent register 282 at the host controller 180 that should be set to the first value to indicate the occurrence of the overcurrent at the USB port 146N.

Specifically, the system processor 110 may access mapping information stored at the mapping registers 286 of the host controller 180 to determine that the overcurrent register 282 corresponds to the USB port 146N that is drawing overcurrent. In some examples, the mapping information may be stored at a particular mapping register 286. By executing the handler code 254, the system processor 110 may be able to access the particular mapping register 286 to determine that the USB port 146N corresponds to the overcurrent register 282.

Responsive to the overcurrent register 282 that is associated with USB port 146N being set to the first value, the host controller 180 may route an interrupt message to the operating system 256 of the computing device 100 through an interface such as an Advanced Configuration and Power Interface (ACPI). The interrupt message may indicate the occurrence of overcurrent at the USB port 146N.

Upon receiving the interrupt message from the host controller 180, the operating system 256 may cause an alert indicating an occurrence of overcurrent at the USB port 146N be notified (e.g., through a display of the computing device 100 not shown in FIG. 2) to a user.

Example Overcurrent Reporting Process

Figure 3:
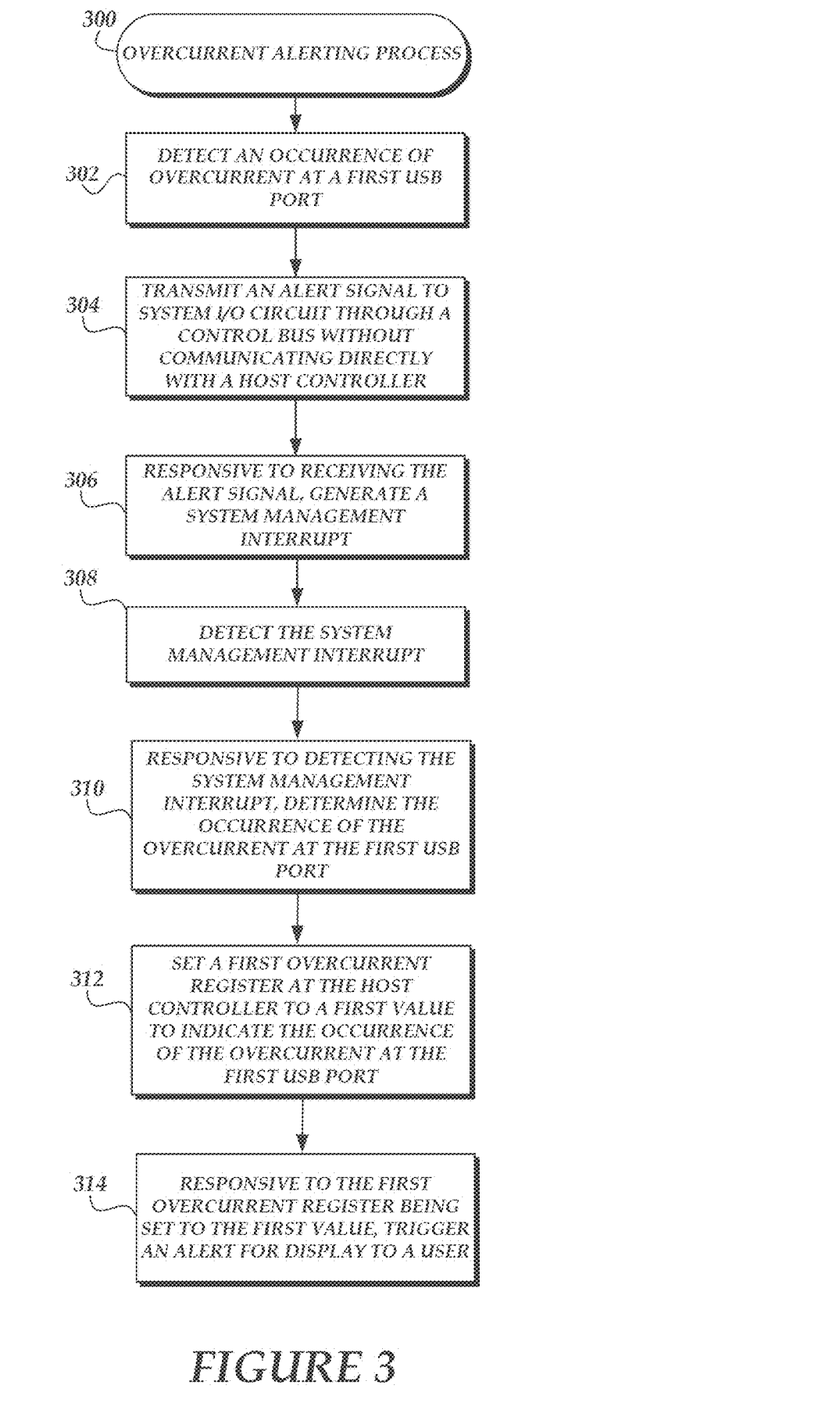
FIG. 3 depicts a flowchart of an example overcurrent alerting process in accordance with some examples of the present disclosure.

With reference to FIG. 3, an illustrative process 300 for generating an alert in response to an occurrence of overcurrent on a USB port of a computing device will be described. The process 300 may be implemented by any system that can detect the occurrence of an overcurrent on a port and that can generate an alert in response to the overcurrent using without a direct connection between the port and the controller hub. For example, the process 300 can be implemented by at least one of the USB interface circuit 140, the system processor 110, the host controller 180, and the like. To simplify discussion and not to limit the present disclosure, the process 300 will be described with respect to particular elements or systems.

The process begins at block 302, where the power delivery controller 144, for example, detects an occurrence of overcurrent at a first USB port. As discussed above, the first USB port can be one of the USB ports 146A through 146N. The power delivery controller 144 may detect the occurrence of overcurrent at the first USB port by monitoring the voltage variation or the current flow at the first USB port.

At block 304, in response to detecting the occurrence of overcurrent at the first USB port, the power delivery controller 144 may transmit an alert signal to the system input/output circuit 220 through a control bus (e.g., the control bus 230) without communicating directly with the host controller 180. In some examples, the alert signal may indicate the occurrence of an overcurrent event. Further, the alert signal may identify the USB port where the overcurrent event occurred.

At block 306, responsive to receiving the alert signal, a system management interrupt (SMI) may be generated. Specifically, the system input/output circuit 220 may generate the SMI in response to receiving the alert signal from the USB interface circuit 140. The system input/output circuit 220 may then transmit the SMI to the system processor 110 through a communication link, such as the system bus 170, between the system input/output circuit 220 and the system processor 110.

At block 308, the system processor 110 may detect the SMI. In some examples, the SMI may be fed into a physical pin of the system processor 110. By monitoring the physical pin, the system processor 110 may detect the SMI. In other examples, instead of receiving the SMI from a physical pin, virtual wires may be utilized. For example, a message may be sent from the system input/output circuit 220 through a virtual wire on a direct media interface (DMI) bus to the system processor 110 such that the system processor 110 may detect system management interrupt.

At block 310, responsive to detecting the SMI, the system processor 110 may determine the occurrence of the overcurrent at the first USB port. In some examples, the system processor 110 may enter a system management mode (SMM) and execute the handler code 254 to determine that the overcurrent condition indicated by the alert signal is occurring at the first USB port. More specifically, by executing the handler code 254, the system processor 110 may access and decode a message generated by the power delivery controller 144 when the power delivery controller 144 detects the occurrence of overcurrent at the first USB port. The message may identify the USB port 146N as the port that draws overcurrent.

In other examples, the alert signal received by the system input/output circuit 220 may identify the first USB port as the port that draws overcurrent and the system input/output circuit 220 may transmit this information to the system processor 110 along with the transmission of the SMI such that the system processor 110 may determine the occurrence of the overcurrent at the first USB port.

At block 312, the system processor 110 may set a first overcurrent register (e.g., one of the overcurrent registers 282) at the host controller 180 to a first value to indicate the occurrence of the overcurrent at the first USB port. In some examples, the system processor 110 may access mapping information stored at the mapping registers 286 of the host controller 180 to determine that the first overcurrent register corresponds to the first USB port that is drawing overcurrent. In some examples, the mapping information may indicate a mapping between overcurrent registers 282 and USB ports of the USB interface circuit 140. For example, the mapping information may indicate that the first overcurrent register maps to the first USB port (e.g., USB port 146A); the mapping information may indicate that a second overcurrent register maps to a second USB port (e.g., the USB port 146B); and the mapping information may indicate that a third overcurrent register maps to a third USB port (e.g., the USB port 146N).

In some examples, the mapping information may be stored at a particular mapping register 286. By executing the handler code 254, the system processor 110 may be able to access the particular mapping register 286 to determine that the first USB port corresponds to the first overcurrent register.

In other examples, the mapping information may be stored at more than one mapping register 286. By executing the handler code 254, the system processor 110 may be able to access those mapping registers 286 to determine that the first USB port corresponds to the first overcurrent register.

In still other examples, some of the mapping information may be stored at other storage elements of the computing device 100 such as the memory 150, the ROM 190, other volatile storage elements or other non-volatile storage elements. By executing the handler code 254, the system processor 110 may be able to access those storage elements of the computing device 100 to determine that the first USB port corresponds to the first overcurrent register.

At block 314, responsive to the first overcurrent register at the host controller 180 being set to the first value, the host controller 180 may trigger an alert for display to a user to notify the user the occurrence of overcurrent at the first USB port. For example, the host controller 180 may send an interrupt message to the operating system 256 of the computing device 100 through an interface such as an Advanced Configuration and Power Interface (ACPI). The interrupt message may indicate the occurrence of overcurrent at the first USB port. Upon receiving the interrupt message from the host controller 180, the operating system 256 may cause the alert indicating the occurrence of overcurrent at the first USB port be notified to the user.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

TERMINOLOGY

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing device comprising:
   a universal serial bus (USB) interface card, comprising:
   a first universal serial bus (USB) port, wherein the first USB port is to connect to a USB device external to the computing device;
   a power delivery controller to:
      detect an occurrence of overcurrent at the first USB port connected to the USB device; and
      responsive to detecting the occurrence of the overcurrent at the first USB port, transmit an alert signal to a system input/output circuit through a control bus without communicating directly with a host controller;
   the system input/output circuit to, responsive to receiving the alert signal, generate a system management interrupt;
   a system processor to:
      detect the system management interrupt;
      responsive to detecting the system management interrupt, determine the occurrence of the overcurrent at the first USB port; and
      set an overcurrent register at the host controller to a first value to indicate the occurrence of the overcurrent at the first USB port;
   the host controller to, responsive to the overcurrent register being set to the first value, trigger an alert for display to a user.

2. The computing device of claim 1, wherein to trigger the alert for display to the user, the host controller sends an interrupt message to an operating system (OS) of the computing device through an Advanced Configuration and Power Interface (ACPI).

3. The computing device of claim 1, wherein the system processor is to:
   access mapping information stored at a first register of the host controller; and
   determine based on the mapping information that the first USB port corresponds to the overcurrent register.

4. The computing device of claim 3, further comprising a memory to store firmware code executable by the system processor, wherein the firmware code includes the mapping information, and wherein the system processor executes the firmware code to store the mapping information at the first register of the host controller.

5. The computing device of claim 1, wherein the host controller and the first USB port lack a physical signal path that connects the host controller to the first USB port.

6. The computing device of claim 1, wherein the control bus is one of a System Management Bus (SMBus), an Inter-Integrated Circuit (I2C), an Improved Inter-Integrated Circuit (I3C), or a Universal Asynchronous Receiver/Transmitter (UART).

7. The computing device of claim 1, further comprising a display, wherein the alert of the overcurrent at the first USB port is displayed via the display.

8. A computing device comprising:
 a first universal serial bus (USB) port, wherein the first USB port is to connect to a USB device external to the computing device;
 a power delivery controller to:
  detect an occurrence of power overdraw at the first USB port connected to the USB device; and
  responsive to detecting the occurrence of the power overdraw at the first USB port, transmit an alert signal to a system processor through a control bus without communicating directly with a host controller;
 the system processor to:
  determine that the alert signal indicates the occurrence of the power overdraw at the first USB port; and
  set an overcurrent register at the host controller to a first value to indicate the occurrence of the power overdraw at the first USB port;
 the host controller to, responsive to the overcurrent register being set to the first value, trigger an alert for display to a user.

9. The computing device of claim 8, further comprising a mainboard, wherein the first USB port, the power delivery controller, the system processor and the host controller are deployed on the mainboard.

10. The computing device of claim 8, wherein the power overdraw at the first USB port is an overcurrent or an overvoltage at the first USB port.

11. The computing device of claim 8, further comprising a USB interface card, wherein the first USB port and the power delivery controller are deployed on the USB interface card.

12. The computing device of claim 8, wherein the system processor is to:
 access mapping information stored at a first register of the host controller; and
 determine the mapping information corresponds the first USB port to the overcurrent register.

13. The computing device of claim 8, wherein the host controller and the first USB port lack a physical signal path that connects the host controller to the first USB port.

14. The computing device of claim 8, wherein the control bus is a System Management Bus (SMBus), an Inter-Integrated Circuit (I2C), an Improved Inter-Integrated Circuit (I3C), or a Universal Asynchronous Receiver/Transmitter (UART).

15. The computing device of claim 8, wherein to trigger the alert for display to the user, the host controller is to send an interrupt message to an operating system (OS) of the computing device through an Advanced Configuration and Power Interface (ACPI).

16. The computing device of claim 15, wherein responsive to receiving the interrupt message, the OS causes the alert displayed to the user.

17. A method for triggering an alert of an occurrence of overcurrent at a first port of a computing system, wherein the first port is to connect to a device external to the computing system, the method comprising:
 detecting the occurrence of the overcurrent at the first port connected to the device;
 responsive to detecting the occurrence of the overcurrent at the first port, transmitting an alert signal to a system processor of the computing system through a control bus without communicating directly with a host controller of the computing system;
 determining that the alert signal indicates the occurrence of the overcurrent at the first port;
 setting an overcurrent register at the host controller to a first value to indicate the occurrence of the overcurrent at the first port; and
 triggering the alert of the occurrence of the overcurrent at the first port.

18. The method of claim 17, wherein triggering the alert of the occurrence at the first port comprises:
 sending an interrupt message to an operating system (OS) of the computing system through an Advanced Configuration and Power Interface (ACPI).

19. The method of claim 17, further comprising:
 accessing mapping information stored at a first register of the host controller; and
 determining the mapping information corresponds the first port to the overcurrent register.

20. The method of claim 17, wherein the host controller and the first port lack a physical signal path that connects the host controller to the first port.

* * * * *